United States Patent [19]

Greiner et al.

[11] 4,255,257

[45] Mar. 10, 1981

[54] PROCESS FOR THE TREATMENT OF WATER

[75] Inventors: Günther Greiner; Wolfgang Grünbein, both of Liederbach; Erhard Albrecht, Düsseldorf, all of Fed. Rep. of Germany

[73] Assignees: Hoechst Aktiengesellschaft; Messer Griesheim GmbH, both of Frankfurt am Main, Fed. Rep. of Germany

[21] Appl. No.: 749,437

[22] Filed: Dec. 10, 1976

[30] Foreign Application Priority Data

Dec. 13, 1975 [DE] Fed. Rep. of Germany ....... 2556328

[51] Int. Cl.³ .............................................. C02F 1/78
[52] U.S. Cl. ................................... 210/709; 210/760; 210/712; 210/716; 210/718; 210/721
[58] Field of Search .......................... 210/63 Z, 50, 63

[56] References Cited

U.S. PATENT DOCUMENTS

| | | | |
|---|---|---|---|
| 3,732,163 | 5/1973 | Lapidot | 210/63 Z |
| 3,748,262 | 7/1973 | Lee et al. | 210/63 Z |
| 3,823,728 | 7/1974 | Burris | 210/63 Z |

*Primary Examiner*—Thomas G. Wyse
*Attorney, Agent, or Firm*—Curtis, Morris & Safford

[57] ABSTRACT

In a process for the treatment of water with ozone a partial current of treated water is contacted under pressure in a packed column with an oxygen-ozone mixture from an ozonizer to oxidize water contaminants and to improve their flocculation. The portion of oxygen which has not dissolved in the water in the packed column is recycled into the ozonizer and the treated partial water current is mixed again with water to be treated. The pressure in the column is adjusted in dependence on the nitrogen content of the water to be treated. By this measure is ensured that the quantity of nitrogen escaping from the water and contained in the cycle oxygen permits an optimum operation of the ozonizer. The nitrogen content in the cycle oxygen is preferably kept below 10% by volume.

4 Claims, 1 Drawing Figure

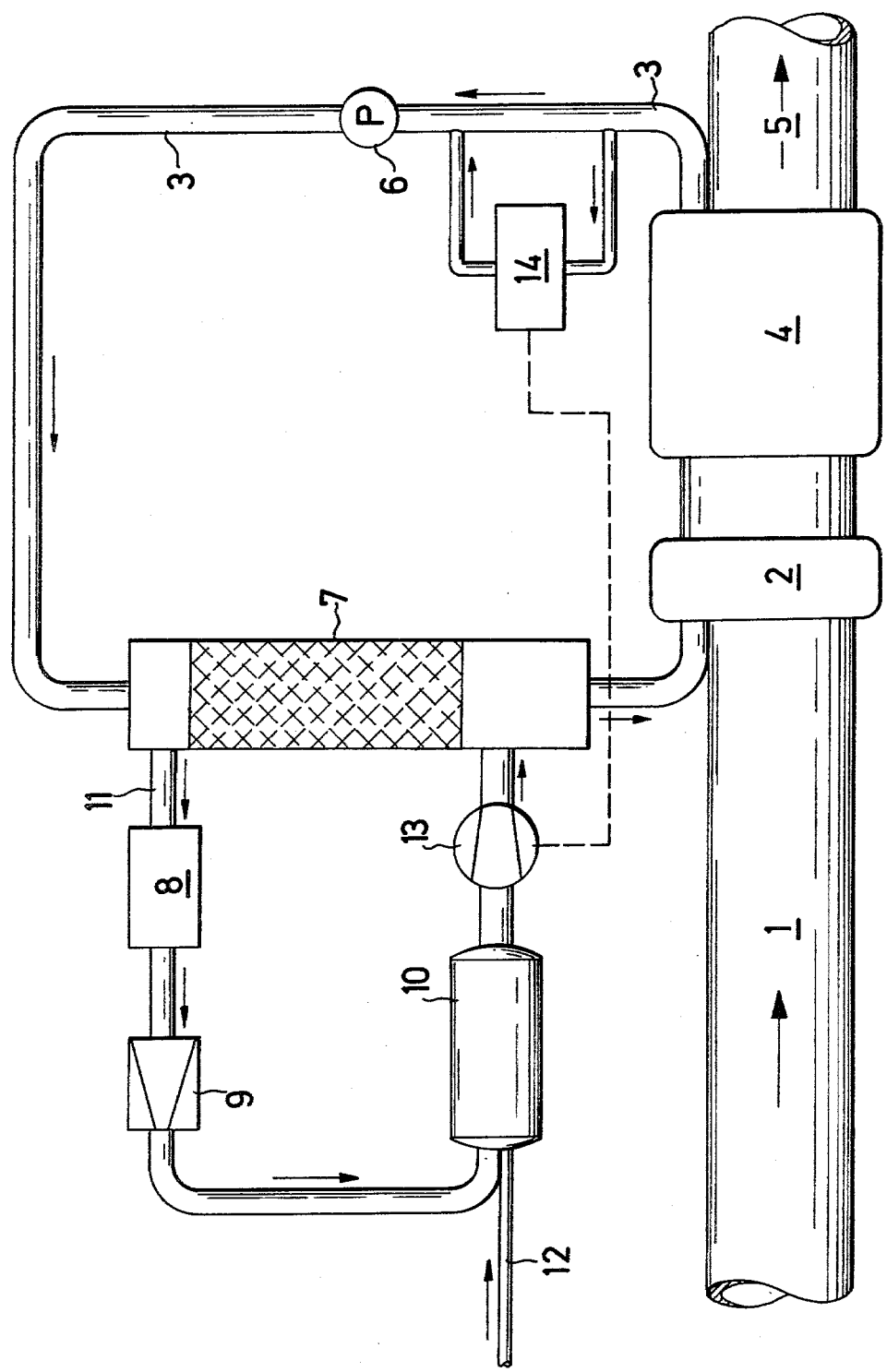

PROCESS FOR THE TREATMENT OF WATER

The present invention relates to a process for the treatment of water, especially for the treatment of water to give drinking quality and for the purification of waste water with ozone produced from pure oxygen.

The necessity to purify waters of a higher and higher degree of contamination to obtain drinking water, to re-use process waters and, for the sake of environmental protection, substantially to purify waste waters, requires highly efficient and economical processes with a low demand of raw material and energy. These requirements can be fulfilled by using ozone which oxidizes the undesired water contaminants and improves their flocculation. As in the purification to drinking water only purely chemical processes take place, the addition of ozone and oxygen allows taking advantage of both the ozone and the pure oxygen. In the purification of waste water, however, oxygen leads mainly to biochemical processes and the ozone-oxygen mixture to chemical processes. The high toxicity of ozone for all living matter excludes any biochemical purification effect. Because of its explosiveness, pure ozone can be used neither in the liquid nor in the gaseous state.

When using ozone-air mixtures, the ozone proportion is in the range of from 1 to 2% by weight. In spite of the better solubility of ozone in water, which is about 10 times as high as that of oxygen, such a low ozone content requires extensive and expensive feeding processes. As compared therewith, the preparation of ozone from pure oxygen, instead of air, permits a much higher ozone concentration (normally 4% by weight and more), which results in a considerable reduction of the investment costs.

The operating expenses of oxygen-ozone plants seem to be higher than those of air-ozone plants due to the necessary oxygen demand. But this is not the case owing to the advantages of the higher ozone concentration, the higher ozone yield and the lower energy demand. The greatest problem of the ozone-oxygen use is the utilization of the oxygen. This problem can be solved by separating ozone from oxygen directly after the ozonizer, re-using the oxygen for the ozone production and conducting the ozone into the water to be purified by means of a cheap carrier gas. The separation can be effected either by condensation of the ozone or by adsorption of the ozone on silica-gel. According to another known process (Chemie Ingenieur Technik, 46th year, 1974, no. 8, page 339) the waste water is ozonized directly in a packed column with the ozone-oxygen mixture leaving the ozonizer. In said column a partial current of the water to be treated is contacted under pressure with the ozone-oxygen mixture, whereby the major portion of the ozone and part of the oxygen dissolve in the partial current. The partial current treated in this manner is then combined again with the untreated water. The ozone which has not been dissolved is destroyed in an ozone annihilator, while the undissolved oxygen is recycled into the ozonizer. By optimizing the operating conditions of the packed column in said process a complete dissolution of the ozone in the packed column has become possible so that the ozone annihilator can be dispensed with.

The present invention seeks to improve the aforesaid process with regard to the nitrogen escaping from the partial water current.

Owing to the fact that in a pure oxygen atmosphere nitrogen escapes from the water which is normally saturated with nitrogen, after a certain period under low pressure nitrogen strongly concentrates in the circulating oxygen. However, a high nitrogen proportion in the cycle gas hinders the ozone production and should be avoided. To this effect, the absorption of the ozone in the packed column is carried out under pressure. The percentage of nitrogen thus drops from 80 % under 1 bar to about 15 % under 5 bar in the cycle system. Another effect of the working under pressure is that a greater portion of ozone is absorbed. In this manner, with a constant nitrogen content in the water to be treated a constant low nitrogen content in the cycle system can be maintained. But the nitrogen content of the water to be treated is not constant. It is normally saturated with nitrogen, but often it is oversaturated with nitrogen. These variations of the nitrogen content in the water result in corresponding variations of the nitrogen content in the cycle gas. As the circulating gas is fed again to the ozonizer, the efficiency thereof is affected by the varying nitrogen content in the circulating gas. Ozonizers operate in optimum manner only when the feed gas has a very definite nitrogen content, which depends on the type of the ozonizer used and is generally in the range of from 2 to 11 % by volume. Even slight deviations from the optimum value considerably increase the energy demand.

It is the object of the present invention to improve the known process by making sure that a gas with constant nitrogen content is fed to the ozonizer.

The invention provides, in a process for the treatment of water, especially for the treatment of water to give drinking quality, and for the purification of waste water in which undesired water contaminants are oxidized and their flocculation is improved by enriching a partial current of the water in a packed column with ozone under pressure by contacting said partial current with an oxygen-ozone mixture from an ozonizer, mixing the partial current again with the water to be treated and reconducting the oxygen which has not been dissolved in the water in the packed column as cycle oxygen to the ozonizer, the improvement which comprises adjusting the pressure of the column, in dependence on the nitrogen content of the water to be treated, in such a manner that in normal operation the nitrogen escaping from the partial current of water in the packed column is contained in the oxygen recycled into the ozonizer in an amount to permit an optimum operation of said ozonizer.

In general, the amount of nitrogen in the cycle oxygen should be in the range of from 2 to 11 % by volume, preferably it should be below 10 % by volume.

The invention will now be described in further detail and by way of example with reference to the accompanying drawing which represents a flow scheme of the improved process.

The untreated water 1 entering the plant is mixed in a reactor 2 with a partial current 3 of already treated water highly enriched with ozone, whereby an intense reaction of the ozone with the water contaminants takes place. In the after-treatment device 4 by the water treatment is continued, for example by adding chemicals, bringing about flocculation and filtration. The purified water 5 issuing from the device 4 is removed from the plant. A partial current 3 of the purified water 5 is pressurized by pump 6 to a pressure which is higher than the pressure in the column 7. It is then introduced through a nozzle at the head of packed column 7 wherein it is treated in counter-current flow with ascending ozone-containing oxygen. Thereafter, the partial current 3 charged with ozone and oxygen is added in reactor 2 to the water to be treated. The oxygen which has not been consumed in packed column 7 leaves said column at the head as cycle oxygen 11, passes a dryer 8 and in a pressure reducer 9 its pressure is brought to the level admissible in ozonizer 10. The cycle oxygen 11 is replenished by additional oxygen 12 to compensate for the losses by the ozone consumption and the dissolution of oxygen in partial water current 3. The ozone formation takes place in ozonizer 10. The cycle oxygen leaving the ozonizer 10 has a high ozone content. After pressure increase by a water ring compressor 13 it flows into the packed column 7.

In packed column 7 nitrogen degasses from the partial water current 3. Depending on the nitrogen content in partial water current 3 and on the pressure in packed column 7, a definite nitrogen content is obtained in the cycle oxygen in normal operation. According to the invention, the nitrogen content of the partial water current 3 is measured by analyzer 14 and, depending on the measured nitrogen content, the pressure produced in packed column 7 by water ring compressor 13 is adjusted in such a way that the nitrogen content in the cycle oxygen 11 permits an optimum operation of the ozonizer 10. The nitrogen content in the cycle oxygen to be attained in each case depends on the type of ozonizer 10 and generally, it is in the range of from 2 to 11 % by volume.

Instead of the nitrogen content of the partial water current the oxygen content of the gas mixture escaping from the column can be measured assuming, for reasons for simplicity, that the mixture solely consists of oxygen and nitrogen, without taking into consideration the minor amounts of noble gases and $CO_2$ contained in the mixture.

What is claimed is:

1. In a process for treatment of water containing nitrogen wherein water contaminants are oxidized and their flocculation is improved by enriching a partial current of the untreated water with an oxygen-ozone mixture in a pressurized packed column, mixing the partial current with the untreated water for treatment thereof and recycling undissolved oxygen from the column as cycle oxygen to an ozonizer, the improvement which comprises adjusting the operating pressure of the column in response to the nitrogen content of the untreated water so that the nitrogen degassing from the partial current of water in the packed column is contained in the oxygen recycled to the ozonizer for optimum operation thereof.

2. The process of claim 1, wherein the proportion of nitrogen in the cycle oxygen is kept in a range of from 2 to 11 % by volume.

3. The process of claim 1, wherein the nitrogen proportion in the cycle oxygen is below 10 % by volume.

4. The process of claim 1 wherein the treated water is of drinking quality.

* * * * *